United States Patent [19]

Hicks

[11] Patent Number: 5,058,916
[45] Date of Patent: Oct. 22, 1991

[54] APPARATUS FOR PROVIDING ADDITIONAL LIFT IN A RETRACTABLE SUSPENSION

[75] Inventor: William J. Hicks, Muskegon, Mich.
[73] Assignee: Lear Siegler Truck Products Corp., Muskegon, Mich.
[21] Appl. No.: 540,489
[22] Filed: Jun. 18, 1990
[51] Int. Cl.⁵ .............................................. B60G 11/26
[52] U.S. Cl. .................................. 280/704; 280/711; 180/209
[58] Field of Search ................. 280/704, 711; 180/209
[56] References Cited

U.S. PATENT DOCUMENTS

| | | | |
|---|---|---|---|
| 2,821,409 | 1/1958 | Chalmers | 280/711 |
| 3,001,796 | 9/1961 | Martin | 280/704 |
| 4,300,787 | 11/1981 | Vandenberg | 280/704 |
| 4,309,045 | 1/1982 | Raidel | 280/711 |
| 4,838,566 | 6/1989 | Baxter et al. | 180/209 |

Primary Examiner—Kenneth R. Rice
Assistant Examiner—Michael Shaughnessy
Attorney, Agent, or Firm—Varnum, Riddering, Schmidt & Howlett

[57] ABSTRACT

An improved lift mechanism is provided in an air spring trailing arm suspension comprising control arms pivotally mounted to a frame and adapted to carry ground-engaging wheels. An air spring is mounted between the control arms and the frame. A plate member mounted for vertical displacement on guide rods secured to the frame carries an upper portion of the air spacing so that the air spring can be vertically displaced relative to the frame. A lower portion of the air spring engages a piston which is kept in a generally upwardly facing orientation by a parallelogram linkage. A ratchet and pawl mechanism locks the control arms in the retracted position, and a latch mechanism locks the plate member to the frame when the plate member is vertically displaced to a lower limit of vertical movement.

28 Claims, 12 Drawing Sheets

APPARATUS FOR PROVIDING ADDITIONAL LIFT IN A RETRACTABLE SUSPENSION

BACKGROUND OF THE INVENTION

1. Field of the Invention

This invention relates to motor vehicle suspensions. More particularly, the invention relates to lift mechanisms for retractable suspensions used on trailers which are adaptable for both highway and railroad use.

2. Scope of the Prior Art

An increasingly common form of transportation includes the use of trailers which are adapted for both highway and railroad use. Such trailers are typically constructed with reinforced frames designed to withstand the forces of normal rail service as well as the forces associated with normal highway service. The wheel gear upon which the trailers ride obviously depends upon whether the trailer is to be used in normal highway service or on a railroad track. In the former, conventional ground-engaging rubber tires are required, and in the latter, a rail wheel set must be used, sometimes known as a rail bogie.

One trailer in common use is known as a Mark IV trailer which is a completely integrated intermodal vehicle. The Mark IV trailer comprises a two-axle highway wheel set and a single axle rail wheel set, both of which are retractable by means of an air suspension. In the highway mode, the rail wheel set is retracted, and in the rail mode, the highway wheel set is retracted. Typically, the rail wheels are disposed between the tandem axles of the highway wheels. One of the problems with the Mark IV design is that the trailer carries an extra load of deadweight which necessarily forces restrictions on the load-carrying capacity of the trailer in highway use.

Another version commonly used is known as a Mark V trailer which carries no rail-running gear. Instead, its highway wheel set slides forward so that the trailer can be mounted on a freestanding, air suspension, two-axle rail bogie. The suspension in the highway wheel set of the Mark V trailer provides multiple functions. Not only does it provide a normal highway suspension for the wheel set, but it also enables the rear of the trailer to lift relative to the ground to permit the rail bogie to be maneuvered into place underneath the rear of the trailer. The suspension also retracts the highway wheel set relative to the ground so that the trailer comes to rest upon the rail bogie, thus permitting the trailer to be utilized in normal rail service.

Both systems provide lift mechanisms for retracting the highway wheel set with respect to the trailer. The Mark V trailer is lighter than the Mark IV because it does not carry the extra deadweight. However, both trailers provide limited lift of the highway wheel set so that there is a low clearance when the trailer is in the rail mode. Further, the lift mechanisms in both trailers are biased toward the retracted position to prevent the unused wheel set from accidentally falling and interfering with the action of the used wheel set.

There is a need to provide additional lift to a highway wheel set in a trailer that is adapted for use with a detachable rail bogie. It has also been found advantageous to provide an alternative means for securing the highway wheel set in the retracted position.

SUMMARY OF THE INVENTION

The invention is directed to an improvement in a suspension for a vehicle comprising a frame, a pair of control arms pivotally mounted to the frame, an axle rigidly mounted to and between the control arms for carrying ground-engaging wheels, and lift means for moving the control arms and the wheels to a retracted position relative to the frame. The pivotal mounting of the control arms provides the control arms with a swinging movement relative to the frame, and a spring means mounted between the control arms in the frame cushions the swinging movement.

The improvement comprises a retractable means mounted to the frame, with the retractable means carrying an upper portion of the spring means for vertical movement of the upper portion relative to the frame between an upper limit and a lower limit. This structure permits the wheels to be moved a greater degree toward the frame when the lift means moves the control arms and the wheels to the retracted position than by simply collapsing the spring means alone. The retractable means preferably comprises guide means fixedly mounted to the frame and a plate member movably mounted to the guide means. Typically, the guide means comprises vertical rails, and the plate member includes sleeves which are slidably received over the rails. The rails can have stops to limit the upward movement of the plate member.

In one aspect of the invention, the suspension comprises latch means for locking the retractable means relative to the frame when the retractable means is at the lower limit. The latch means includes actuating means responsive to movement of the lift means for automatically unlocking the retractable means when the retractable means is at the lower limit and when the lift means moves the control arms toward the retracted position. Preferably, the frame has faceplates having apertures, and the latch means includes pins mounted to the retractable means for reciprocal movement relative to the retractable means. The pins are adapted to extend into the apertures when the retractable means is at the lower limit.

Preferably, a transverse beam is mounted between the control arm, and the actuating means includes a vertical arm operably connected to the pins and adapted to be engaged by the transverse beam when the lift means moves the control arms in the beam toward the retracted position.

In another aspect of the invention, the suspension comprises movable means mounting a lower portion of the spring means to the control arms for maintaining a predetermined orientation of the lower portion of the spring means with respect to the frame as the control arms swing through an arc. Typically, the spring means includes an air spring. The air spring has an upper portion mounted to the frame and a lower portion mounted to a piston having a generally upwardly facing orientation relative to the frame. Preferably, the movable means comprises a support for pivotally mounting the piston to a control arm and link means pivotally connected to the frame and to the piston for permitting vertical displacement of the piston relative to the frame while maintaining the generally upwardly facing orientation of the piston.

In this structure, a transverse beam can extend between the control arms, pivotally mounted thereto, and the piston can be fixedly mounted to the support on the transverse beam. The transverse beam has a clevis extending radially therefrom intermediate the control arms, and the link means comprises an arm extending generally perpendicularly to the transverse beam and pivotally connected at the clevis, the other end being pivotally connected to the frame. Thus, the pivotal connection of the control arms to the frame defines a first horizontal axis, and the pivotal connection of the transverse beam to the control arms defines a second horizontal axis. The pivotal connection of the arm to the frame defines a third horizontal axis, and the pivotal connection of the other end of the arm to the clevis defines movement about a fourth horizontal axis, thereby defining a parallelogram linkage.

In another aspect of the invention, the suspension comprises lock means mounted to the frame for locking the control arms in the retracted position. The lock means preferably comprises a ratchet and pawl mechanism, wherein the pawl is mounted to and extends from the free end of the control arm, and the ratchet is mounted to the frame. Either the pawl or the ratchet can be movably mounted, so that the pawl can engage the ratchet when the control arms are moved in their retracted position.

BRIEF DESCRIPTION OF THE DRAWINGS

The invention will now be described with reference to the following drawings in which.

DETAILED DESCRIPTION OF THE PREFERRED EMBODIMENTS

Figure 1:
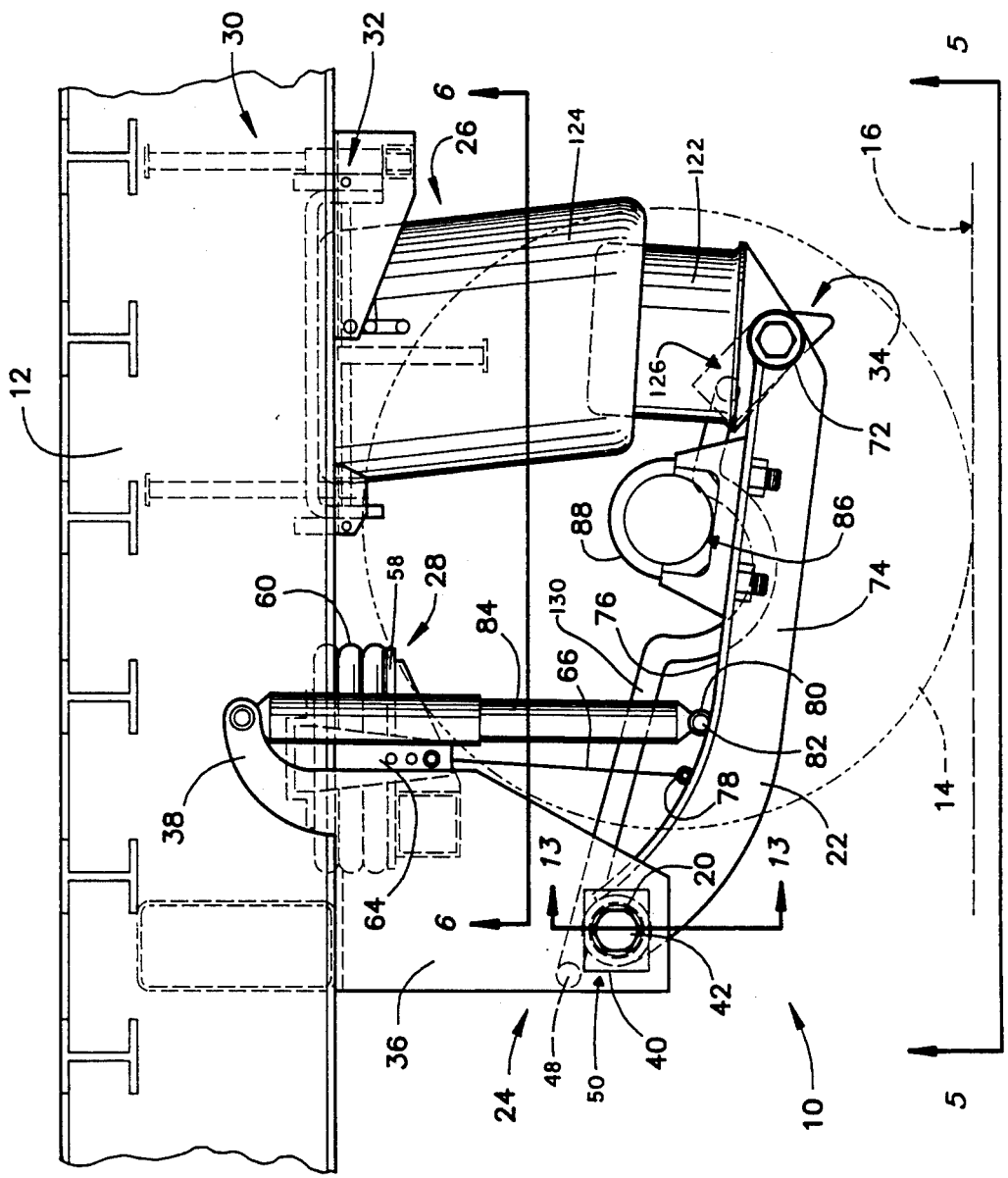
FIG. 1 is an elevational view of a retractable suspension according to the invention in the normal highway mode.
Figure 2:
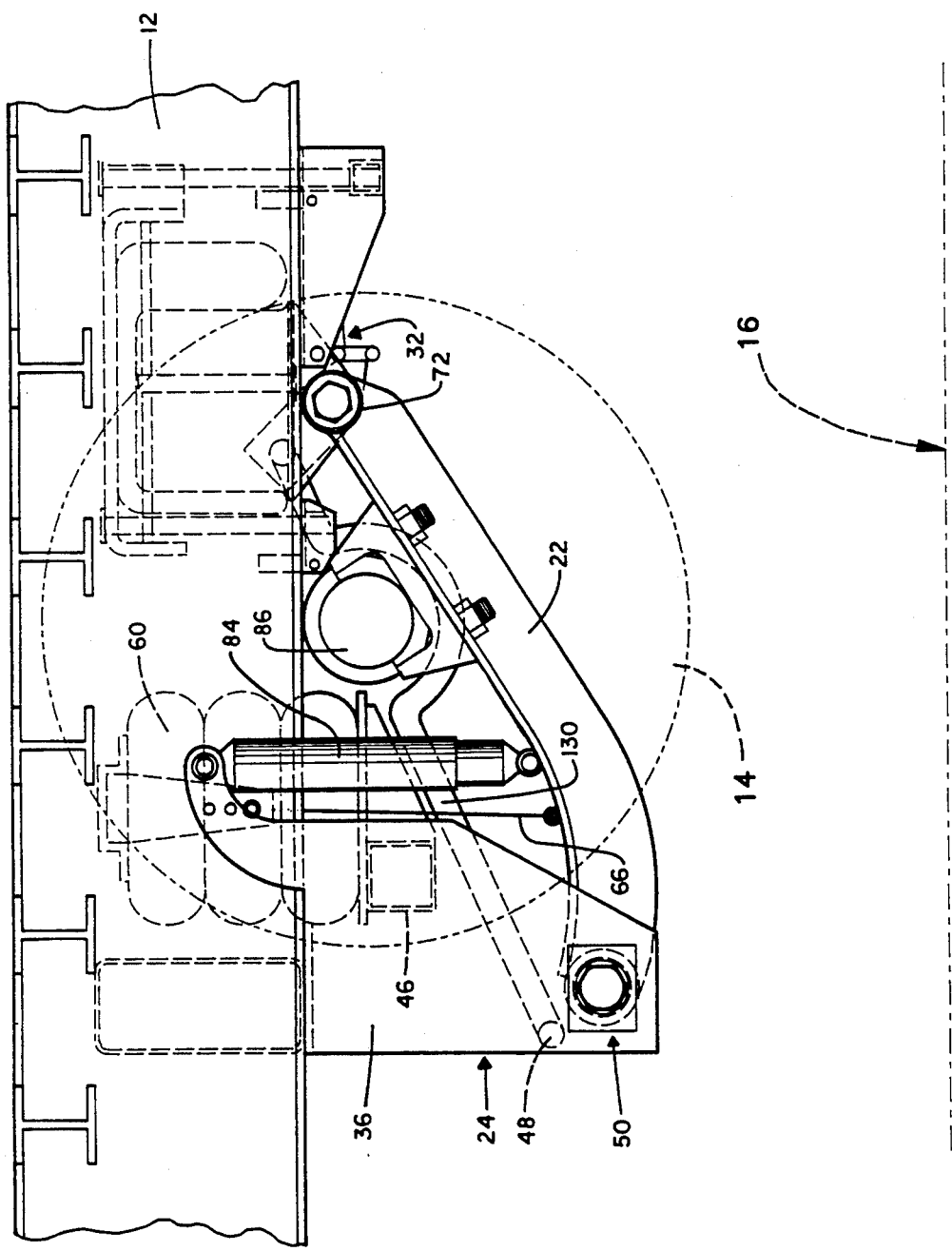
FIG. 2 is an elevational view of the suspension of FIG. 1 in the retracted mode.
Figure 3:
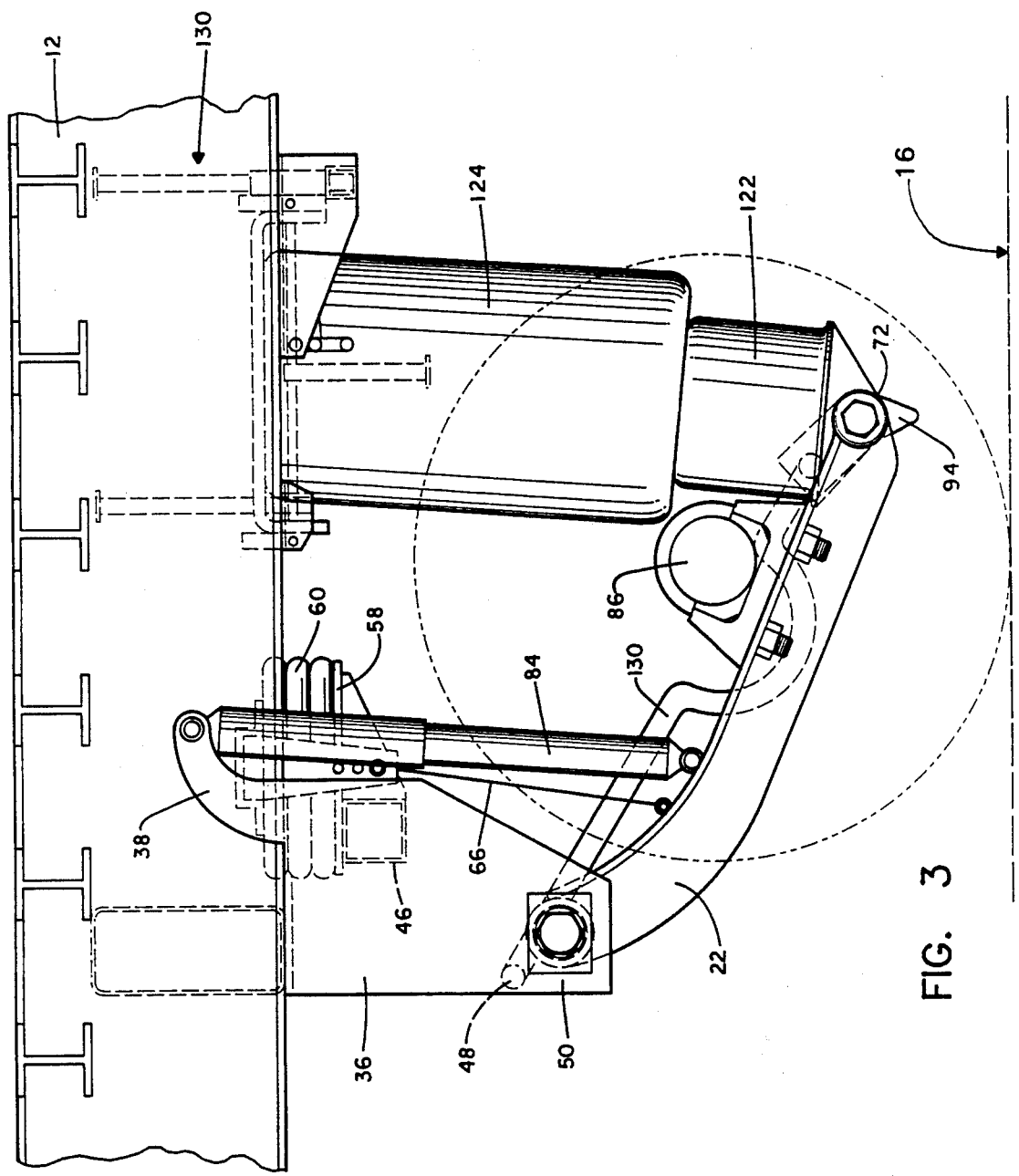
FIG. 3 is an elevational view of the suspension system of FIG. 1 in the extended mode wherein the trailer is attached to a rail bogie.

Referring now to FIGS. 1 through 4, there is shown a suspension system 10 constructed substantially in accordance with the principles of the invention. The suspension 10 is mounted beneath a frame 12 and supports ground-engaging wheels 14. The suspension 10 is further adapted to be retractable whereby the wheels 14 may be lifted off of the ground surface 16 as illustrated in FIG. 2. Further, the suspension 10 is extendible whereby the frame 12 may be lifted relative to the ground surface 16.

Figure 4:
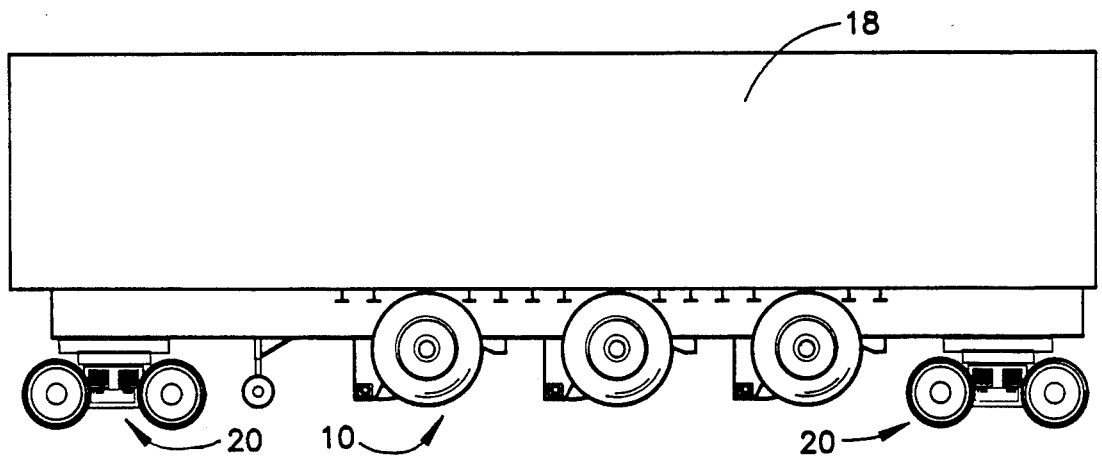
FIG. 4 is an elevational view of a trailer mounted on a wheel bogie, and having a tri-modem wheel set incorporating a suspension in accordance with the invention in the retracted position.

Although the suspension herein described supports a single axle having a single pair of ground-engaging wheels 14, it will be understood that the preferred construction utilizes a tandem axle suspension, or a tridem axle suspension. In any event, a principal function of the retractable suspension is to permit the utilization of the vehicle on a railway in addition to use on a highway. FIG. 4 illustrates a typical configuration of a tridem trailer 18 having a suspension 10 in the retracted position, and mounted on a rail bogie 20 for railroad use. It will be understood that the rail bogie, and detachment mechanisms for securing the trailer to the rail bogie, form no part of this invention, and, in fact, are not necessary for practicing the invention.

Turning again to FIGS. 1 through 3, it can be seen that the suspension 10 comprises a pair of trailing arms 22 also known as control arms, one mounted to each side of the frame 12 in generally parallel relation to each other. Each trailing arm 22 is pivotally mounted at a front end thereof to a frame bracket assembly 24. An air spring assembly 26 is disposed at a rearward portion of the trailing arms 22 so as to cushion the upward and downward movement of the frame 12 with respect to the ground-engaging wheels 14. A primary lift means 28 serves to retract the trailing arms 22 and thus the suspension 10 relative to the frame 12. A secondary lift means 30 facilitates further travel of the trailing arms 22 in an upward and downward direction so that the wheels 14 may be retracted further from the ground surface 16 than would be permitted with the primary lift mechanism alone, and also that the trailing arms 22 may be extended downwardly so as to provide a greater lift on the frame 12 relative to the ground surface 16 than is provided in the prior art.

A lift locking means 32 is provided to lock the secondary lift means 30 in a fixed position relative to the frame 12 when the trailing arms 22 are in an extended position. A highway locking means 34 is provided to hold the trailing arms 22 in a retracted position when the primary lift means 28 is actuated.

Figure 5:
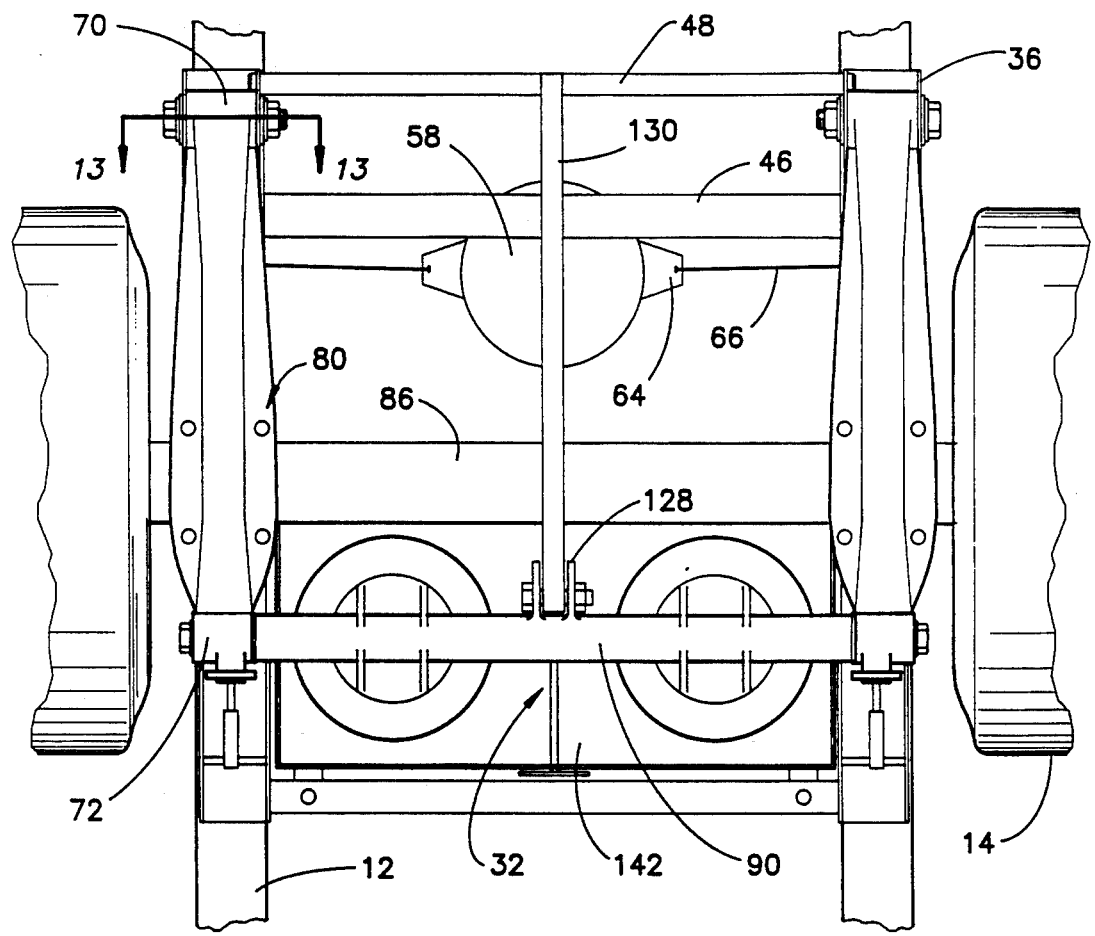
FIG. 5 is a bottom view of the suspension according to the invention taken along line 5—5 of FIG. 1.
Figure 8:
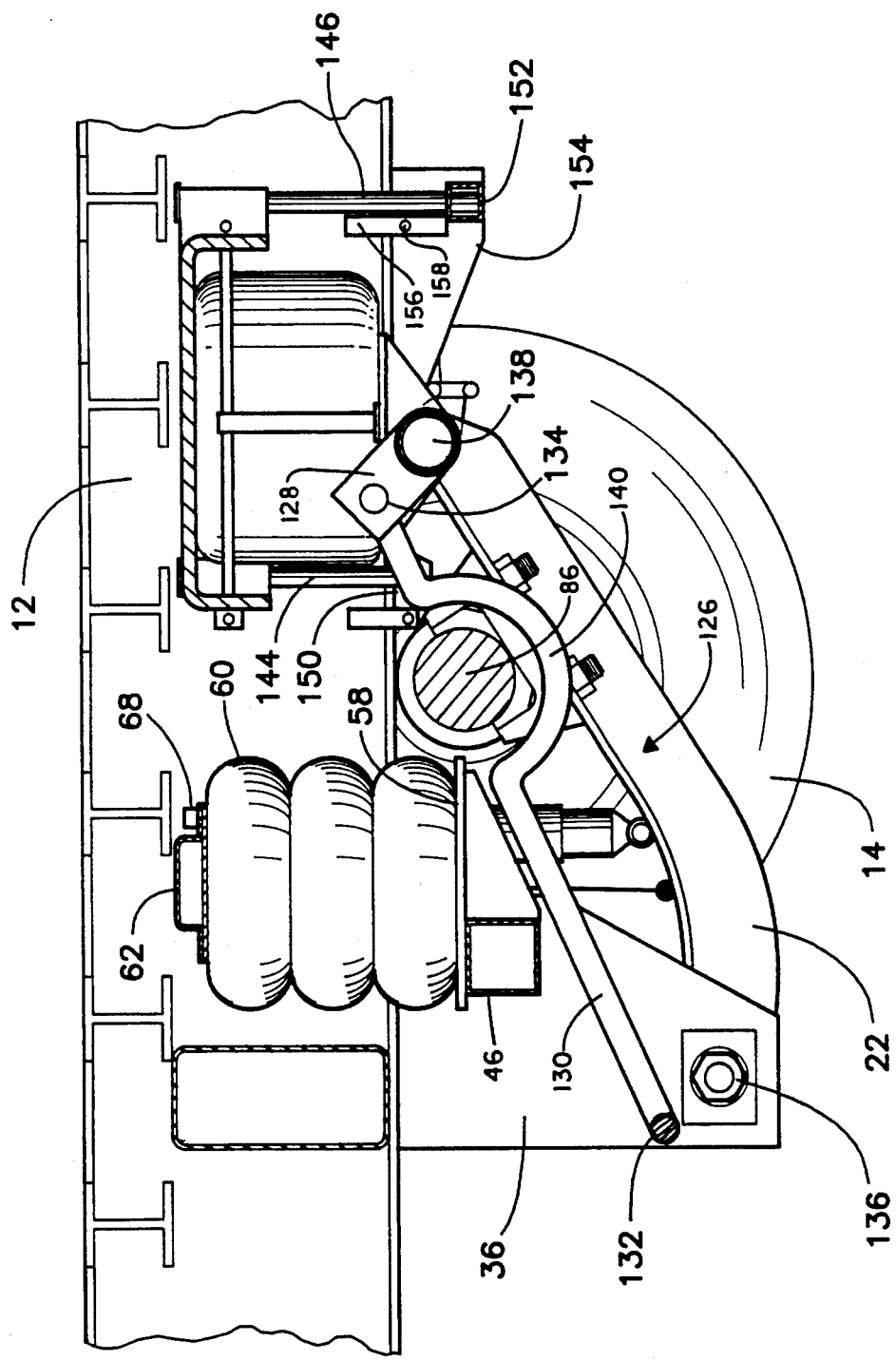
FIG. 8 is a sectional view of the suspension system in the retracted position taken along line 8—8 of FIG. 7.

Referring now to FIGS. 1, 5, and 8 it can be seen that a frame bracket 36 depends from the frame 12 to pivotally mount each trailing arm 22. A support arm 38 extends upwardly from the frame bracket 36 and carries a conventional fixture for mounting the upper end of a shock absorber.

It can be seen that the frame bracket 36 projects laterally outwardly of the side of the frame 12 into alignment with the horizontal space between the frame 12 and the ground-engaging wheel 14. The frame bracket 36 has an elongated opening 40 in each of two depending arms through which a bolt 42 passes. The openings 40 are elongated in the direction of the axis of the vehicle so as to permit the bolt 42 to shift forwardly or rearwardly with respect to the frame bracket 36. An adjustment plate 44 is provided at each end of the bolt in juxtaposition to outside surfaces of the frame bracket 36. This structure facilitates the forward and aft adjustment of each trailing arm 22 in a pair so as to align the suspension 10 relative to the frame 12. The frame bracket 36 and adjustment plates 44 may have interengaging serrations for a gripping adjustment, or alternatively, the adjustment plates 44 may be welded to the frame bracket 36 when proper alignment is obtained. A pair of cross members 46, 48 extend between opposed frame brackets 36 on opposite sides of the frame 12 for a purpose hereinafter described.

Figure 13:
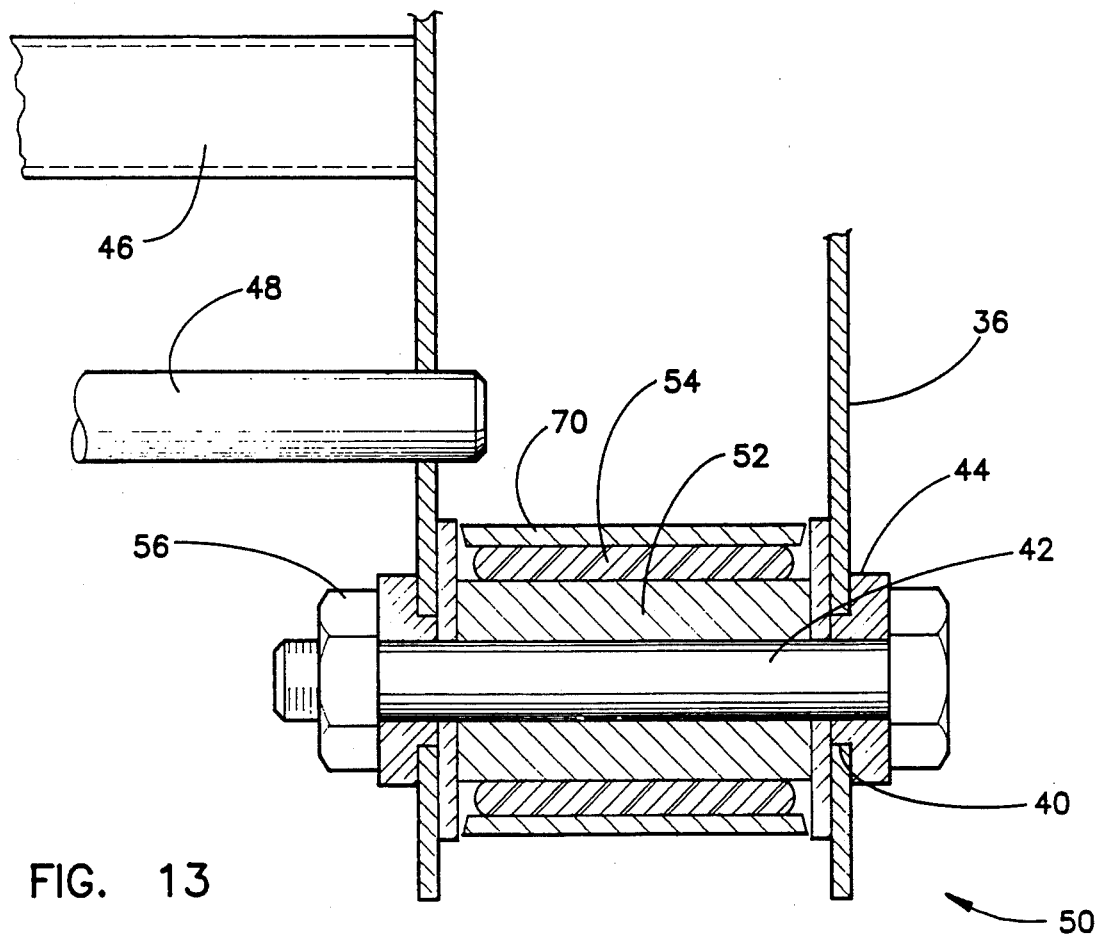
FIG. 13 is a cross-sectional view of a bushed connection taken along line 13—13 of FIG. 1.

Each trailing arm 22 is connected to a frame bracket 36 by arm connecting means 50, the detail of which is best illustrated in FIG. 13. The arm connecting means 50 comprises a core sleeve 52 which mounts a resilient elastomer bushing 54 having a length less than the length of the core sleeve 52. The elastomer bushing 54 is received in a forward collar 70 on the trailing arm 22 to be tightly confined between the forward collar and the core sleeve 52. The collar 70 is substantially the same length as the elastomer bushing 54, i.e., less than the length of the core sleeve 52. The core sleeve 52 is disposed coaxially with the elongated opening 40 and abuts the interior of the depending arms of the frame bracket 36 so that the tightening of the bolt 42 with a nut 56 will clamp the core sleeve 52 tightly within the frame bracket 36. The forward collar 70 on the trailing arm 22 is thus rotatable with respect to the core sleeve 52. In practice, the degree of rotation may be at least as much as 60 degrees, but it will be apparent that the elastomer bushing 52 will permit articulation of the trailing arm 22 in a torsional sense as well as in a linear sense. In other words, the trailing arm 22 can pivotally articulate about the axis of the bolt 42 as well as about an axis perpendicular to the axis of the bolt 42.

Referring again to FIGS. 1, 5, and 8, a lift spring support plate 58 is centrally located on the lift support cross member 46 and carries an air spring 60 thereupon. The air spring 60 is preferably a triple convoluted air spring which, when inflated, expands upwardly a significant linear distance. A primary upper crosspiece 62 mounts an upper surface of the air spring 60 and is secured thereto in a conventional manner. A pair of flanges 64 depend from opposite sides of the primary upper crosspiece 62, and a flexible cable member 66 extends between and is connected to the flange 64 and the trailing arm 22 on each side of the vehicle. An air supply port 68 is provided through the primary upper crosspiece 62 in communication with the interior of the air spring 60 to facilitate the delivery of pressurized air to the air spring from a source (not shown).

The free end of the trailing arm 22 carries a rearward collar 72 which is open in a direction generally parallel to the axis of rotation of the forward collar 70. An intermediate portion 74 of the trailing arm 22 carries a flange at an upper portion thereof which defines an upper surface 76. A lift cable connection 78 is located on the upper surface 76 for connecting an end of the flexible cable member 66 to the trailing arm 22. A shock mounting bracket 80 is also located on the upper surface 76. A mounting bolt 82 received in the mounting bracket 80 secures the lower end of a shock absorber 84 in conventional manner. The upper end of the shock absorber 84 is likewise connected to the shock support arm 38 in conventional fashion. The movement of each trailing arm 22 upwardly and downwardly is thus damped by the connection of the shock absorber 84 between the trailing arm and the frame bracket assembly.

An axle 86 associated with the trailer 18 is fixedly secured to and substantially between an opposed pair of trailing arms 22 by axle connection means 88. A transverse beam 90 extends between the opposed rearward collars 72 and is connected thereto by beam connection means 92. A locking pawl 94 projects rearwardly from the rearward collar 72 for a purpose to be hereinafter described.

Figure 14:
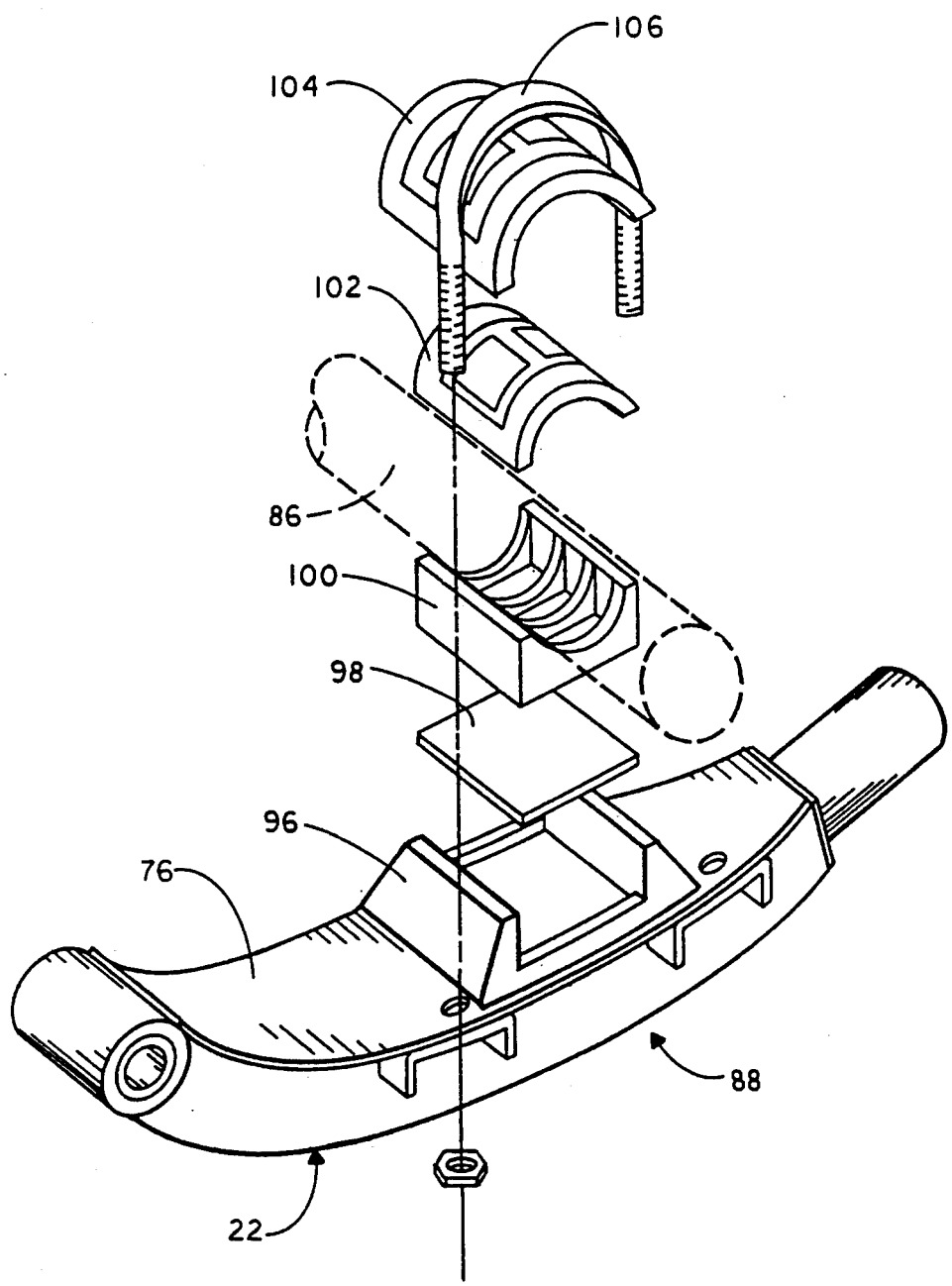
FIG. 14 is an isometric exploded view of the trailing arm and axle connection of the suspension illustrated in FIG. 1.

The axle connection means is best illustrated in FIG. 14. A saddle bracket 96 is rigidly secured to and supported on the upper surface 76 of the trailing arm 22 adjacent the intermediate portion thereof. A resilient pad 98 disposed within the saddle bracket 96 supports an axle adapter bracket 100 which is conformed to receive a particular shape of the axle 86. In the embodiment illustrated, the cross-sectional shape of the axle is circular, but it will be understood that different shapes may well be provided for different axles. Thus, the axle adapter bracket 100 will be provided to receive a particularly configured axle. An upper resilient pad 102 is tightly confined between an upper clamp plate 104 and the axle, with the upper clamp plate having a shape complementary to that of the axle. Clamp bolts 106, which may be generally U-shaped, extend through the saddle bracket 96 to clampingly secure the axle to the trailing arm. The lower and upper resilient pads 98, 102 permit the axle 86 to articulate slightly relative to the trailing arm 22 in response to torsional forces imparted to the axle when the trailing arms are not parallel as, for example, when the trailer is moved over uneven ground surface. However, it will also be apparent from this construction, that the axle will tend to resist lateral forces acting upon the trailing arms 22 when the trailer is used in the highway mode.

Figure 11:
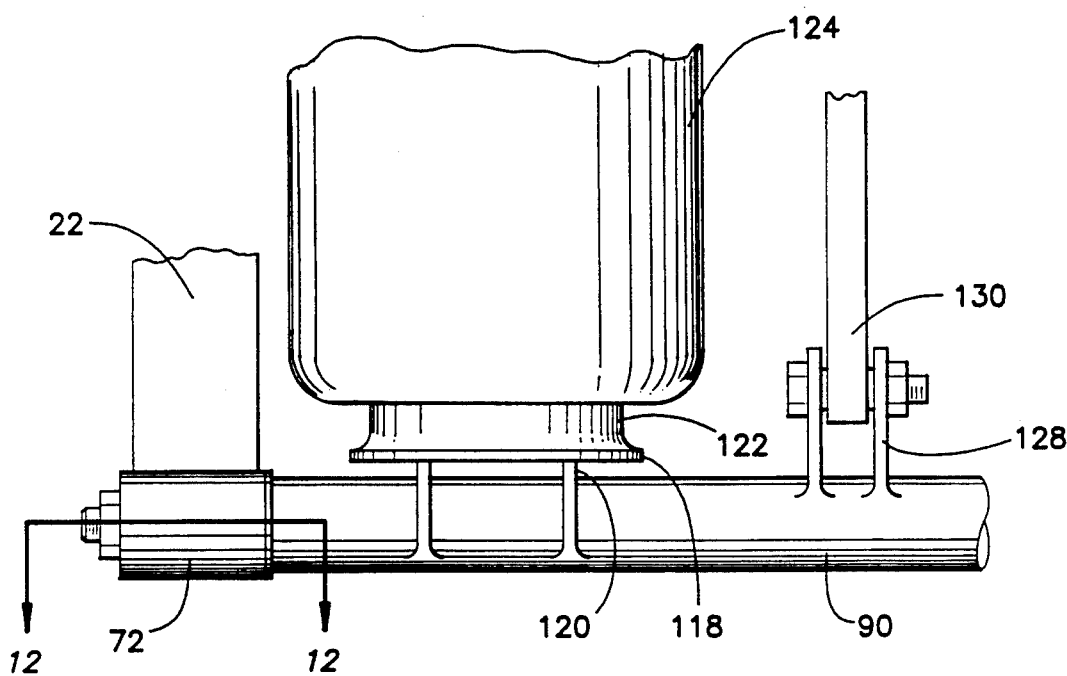
FIG. 11 is a fragmentary rear view of the transverse beam of the suspension in accordance with the invention.
Figure 12:
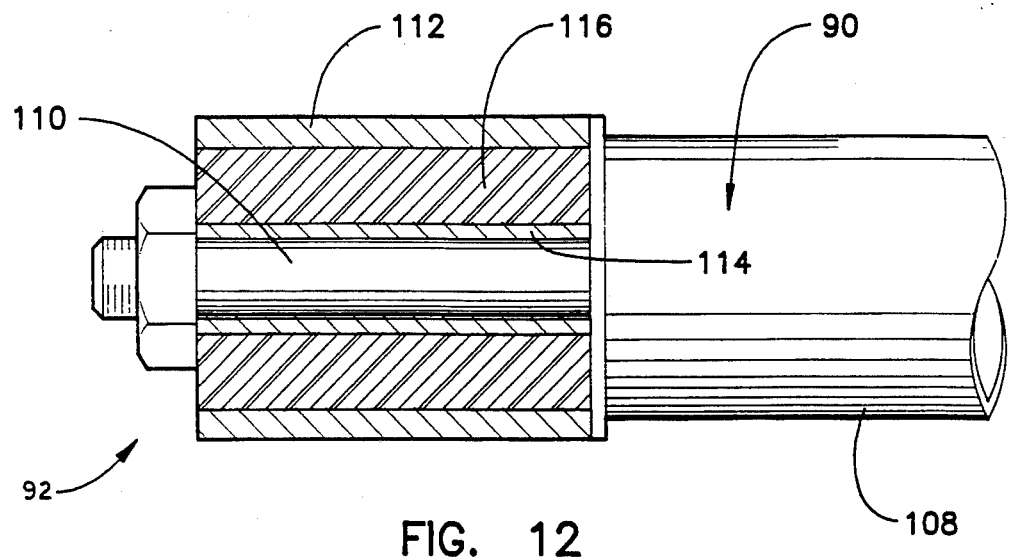
FIG. 12 is a cross-sectional view of a bushed connection taken along line 12—12 of FIG. 11.

Turning now to FIGS. 11 and 12, the transverse beam 90 comprises a shaft 108 having a stub shaft 110 projecting longitudinally thereof from each end. The beam connection means 92 comprises an inner sleeve 114 which is press fit over each respective stub shaft 110. The inner sleeve 114 is received within the rearward collar 72, and a resilient elastomer 116 is tightly confined between the collar 112 and the inner sleeve 114. The beam connection means 92 is thus bushed to permit the transverse beam 90 to rotate relative to the rearward collars 72. This rotation, of course, occurs against the bias of the resilient elastomer 116, but nevertheless limited articulation is permitted.

Figure 7:
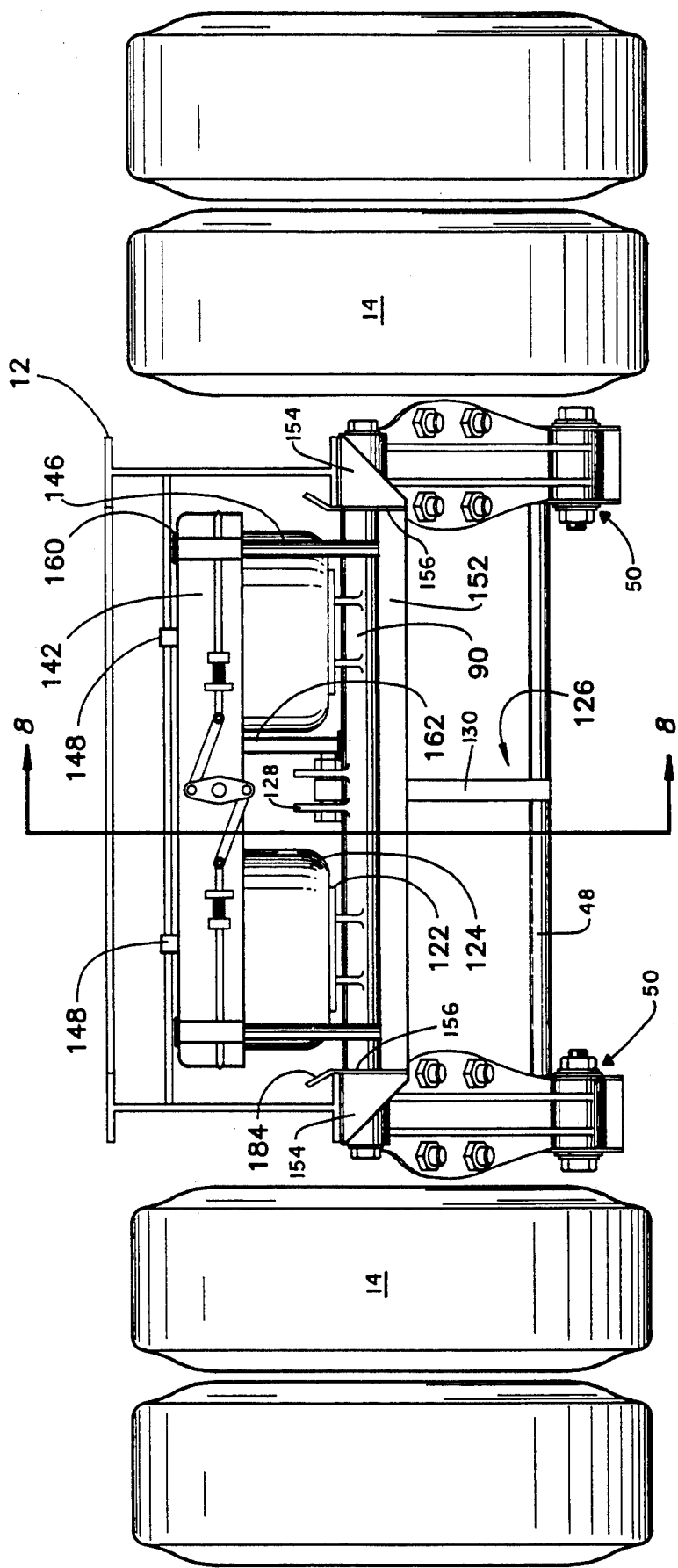
FIG. 7 is a rear view of the suspension system in FIG. 2 in the retracted position.

FIGS. 5, 7, and 11 best illustrate the air spring assembly 26. A support plate 118 is provided on an upper portion of the transverse beam 90 near each end thereof adjacent the beam connection means 92. The support plate 118 is rigidly secured to the beam by means of gussets 120 and, accordingly, rotates with the beam relative to the trailing arms 22. The support plate 118 carries a piston 122 on an upper surface thereof which is adapted to engage an air spring 124.

It is important to maintain the piston 122 in a generally upwardly facing direction in order to properly engage the air spring 124 throughout the upward and downward travel of the transverse beam 90. Therefore, a parallelogram-type linkage 126 is provided to maintain support plates 118 and the corresponding pistons 122 in a generally upwardly facing direction. As shown in FIGS. 1 through 3, and 8, a clevix 128 is rigidly secured to an upper portion of the transverse beam approximately centrally located between the support plates 118. An upper link extends between the link support cross member 48 associated with the frame bracket assembly 24 and the clevis 128. The link 130 is pivotally connected at the cross member 48 to form a first upper pivot axis 132. The pivotal connection between the upper link 130 and the clevix 128 forms a second upper pivot axis 134. It will be seen by this construction that the arm connecting means 40 forms a first lower pivot axis 136, and the beam connection means 92 forms a second lower pivot axis 138. A U-shaped portion 140 is provided in the upper link 130 so that the upper link will stay clear of the axle 86 throughout movement of the trailing arms 22. The parallelogram linkage 126 thus formed causes the support plates 118 and associated pistons 122 to maintain a generally upwardly facing orientation as the trailing arms 22 move between a retracted position illustrated in FIG. 2 and an extended position illustrated in FIG. 3.

Figure 9:
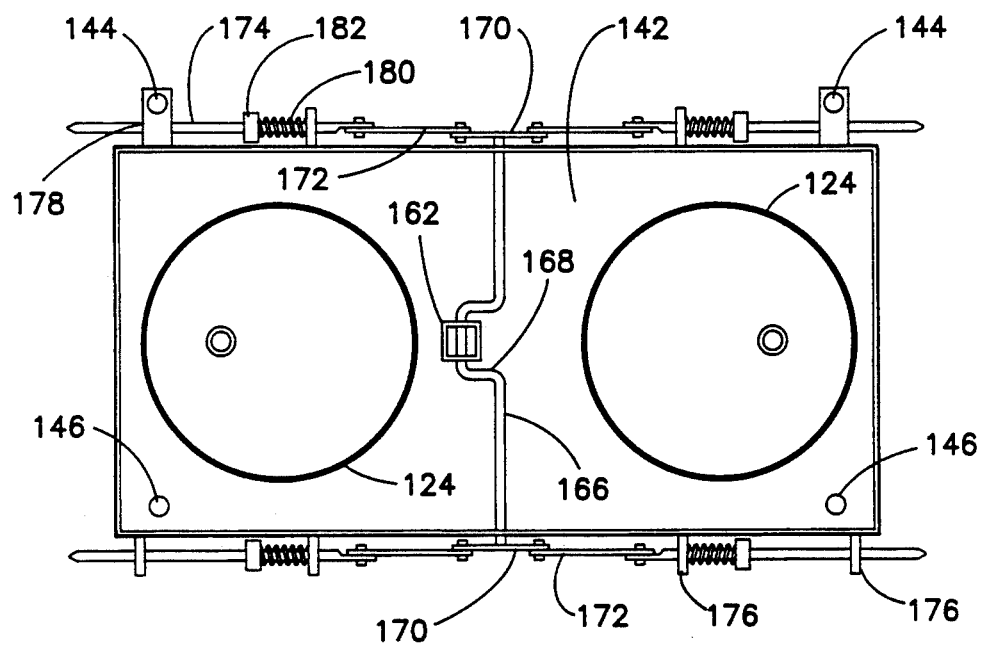
FIG. 9 is a bottom view of the upper air spring crosspiece of the extra lift assembly illustrating detail of a portion of the lock mechanism.

The secondary lift mechanism 30 permits the trailing arms 22 to rotate through a greater arc than is available with prior art structures. FIGS. 7, 8, and 9 illustrate the principal aspects of the secondary lift mechanism. A secondary upper crosspiece 142 is mounted to a pair of forward guide posts 144 and a pair of rearward guide posts 146 and is adapted to slide upwardly and downwardly relative thereto. The secondary upper crosspiece 142 is bolted to an upper portion of the air springs 124 so that the air springs depend therefrom. An air supply port 148 extends through the secondary crosspiece 142 for delivering air to and exhausting air from the air springs 124. Forward support brackets 150 mounted to the frame 12 provide a foundation for the forward guide posts 144 which extend upwardly therefrom. A cross member 152 extends between rearward support brackets 154 to provide a foundation for the rearward guide posts 146. The rearward support brackets 154 are mounted to the frame 12. Each rearward support bracket 154 carries a guide sleeve 156 extending upwardly therefrom which has an aperture 158 to provide a latch for the lift locking mechanism 32. A stop plate 160 at the top of each guide post 144, 146 provides a stop for the upper limit of travel of the secondary upper crosspiece 142 relative to the guide posts 144, 146. A lower limit of travel is established when crosspiece 142 abuts the cross member 152. An actuating arm 162 depends from the crosspiece, pivotally mounted thereto, and preferably guided by a guide bracket (not shown). The actuating arm 162 is adapted to be engaged by the transverse beam 90.

It will be apparent that the suspension 10 may be retracted by actuating the primary lift mechanism 28. Air under pressure is delivered to the air spring 60 which causes the primary upper crosspiece 62 to elevate, pulling up the trailing arms 22 by means of the lifting cables 66. At the same time, air is exhausted from the air springs 124 as each piston 122 is caused to push on its corresponding air spring 124. As the trailing arms 22 are raised, the parallelogram linkage 126 maintains the pistons 122 in a generally upwardly facing orientation to maintain the maximum surface area thereof relative to the air spring 124 causing the air spring to deflate. At some point in the upward travel of the trailing arms 22, the transverse beam 90 will engage the actuating arm 162 and cause the secondary upper crosspiece 142 to travel upwardly on the guide posts 144, 146. At the upper limit of travel illustrated in FIG. 2, the air spring 60 is fully inflated, the air springs 124 are fully deflated, and the secondary upper crosspiece 142 has reached its upper limit of travel adjacent the stop plates 160 on the guide posts 144, 146.

Extension of the suspension 10 occurs by essentially reversing the process. As air is exhausted from the air spring 60 in the primary lift mechanism 28, the trailing arms 22 tend to fall by force of gravity. Similarly, the secondary upper crosspiece 142 descends the guide posts 144, 146 by force of gravity to the lower limit of its travel, whereupon pressurized air is delivered to the air springs 124. As the air springs 124 are expanded, the pistons 122 are driven downwardly to bear against the transverse beam 90. When the crosspiece 142 attains the lower limit of its travel, the trailing arm 22 and transverse beam 90 continue to descend. The transverse beam disengages from the actuating arm 162, thus allowing the crosspiece 142 to automatically lock into position as hereinafter described. When the wheels 14 engage the ground surface 16, the frame 12 is caused to lift upwardly relative to the ground surface 16 as the springs 124 continue to be inflated. When the air springs 124 reach their maximum limit of inflation, the maximum limit of lift is obtained by the secondary lift mechanism 30 as well as the maximum limit of upward travel of the frame 12 relative to the ground surface 16.

It will be apparent that when the suspension is in the extended position, it is important that the lift locking means 32 secure the secondary upper crosspiece 142 relative to the frame 12 in order for the air spring 124 to lift the frame 12 relative to the ground surface 16. Similarly, when the suspension 10 is in the retracted position (as shown in FIG. 2) it is advisable for the highway locking means 34 to retain the suspension 10 in the retracted position in case of failure of the primary lift mechanism 28.

Figure 15:
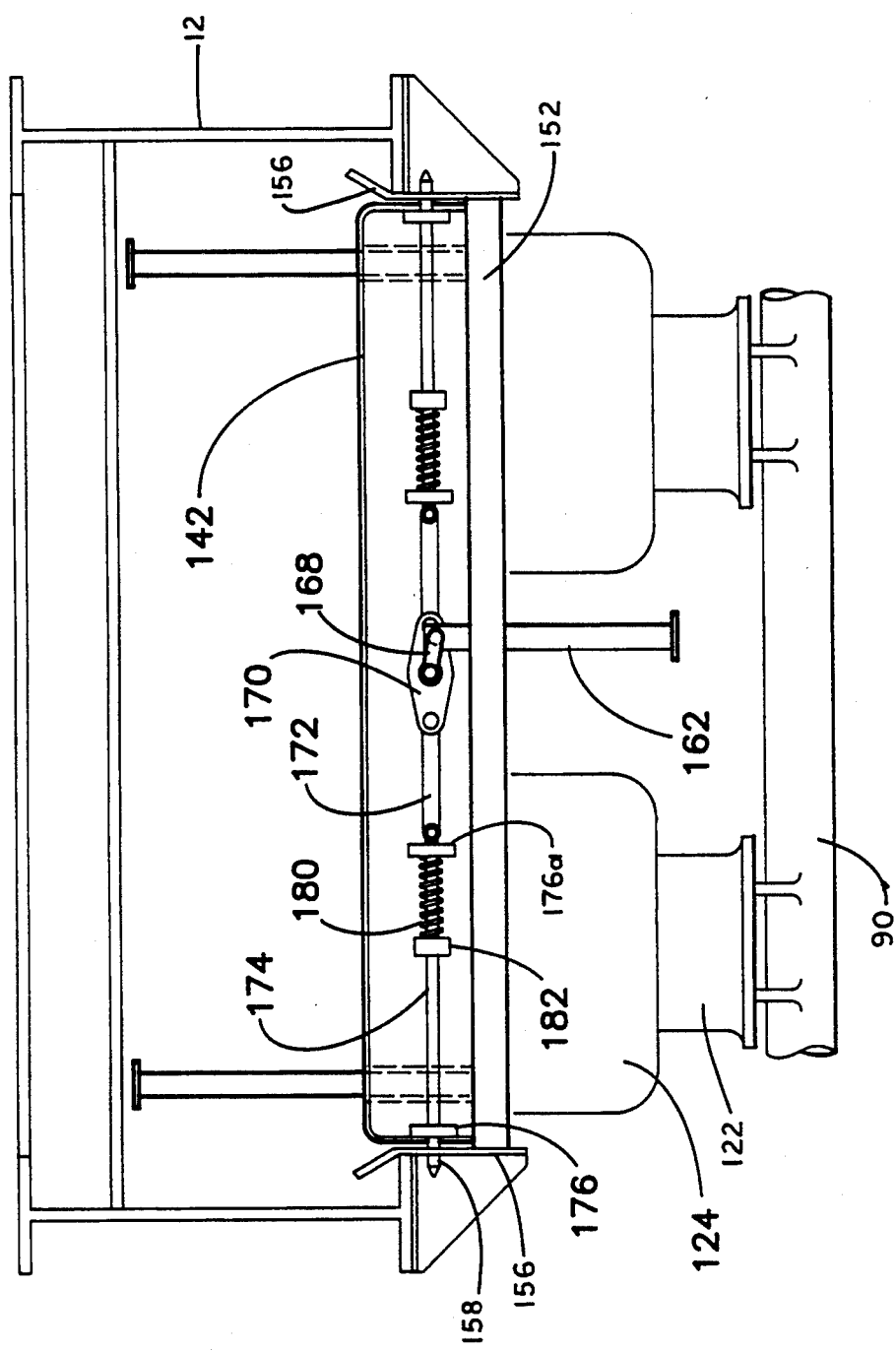
FIG. 15 is a sectional view of the extra lift mechanism in the locked position.
Figure 16:
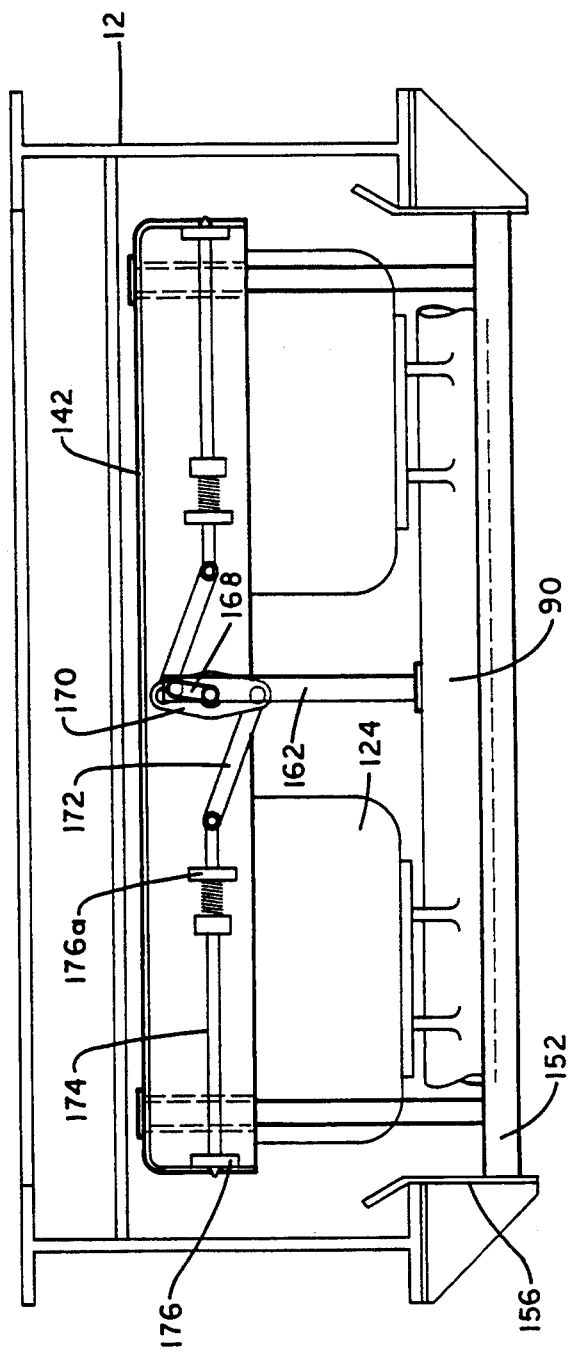
FIG. 16 is a sectional view of the extra lift mechanism in the unlocked position.

Referring now to FIGS. 6, 9, 15, and 16, the lift locking means 32 comprises a rod 166 having a bell crank portion 168 which is adapted to engage the actuating arm 162. The actuating arm may be pivotally secured thereto. A lever 170 is mounted to the rod 166 adjacent each end thereof and rotates therewith. It is readily apparent from the figures that the lift locking means 32 comprises four separate portions to lock the upper crosspiece 142 to the frame 12 at four places. The following description, however, relates to just one of these portions, it being understood that the same description is applicable to all portions thereof. A link 172 is pivotally connected at one end to the lever 170 and another end to a locking pin 174. The locking pin 174 is slidingly supported in a pair of pillow blocks 176 mounted to the upper crosspiece 142. Thus, the locking pin 174 reciprocates relative to the crosspiece 142 as the rod 166 rotates. A coil spring 180 is disposed on the locking pin 174 between the inboard pillow block 176a and a spring retainer 182 carried by the locking pin 174. Thus, the locking pin 174 is biased outwardly so that the end thereof tends to engage the aperture 158 in the guide sleeve 156. FIG. 15 illustrates the position of the upper crosspiece 142 at the downward limit of its travel during the highway mode (see FIG. 1) or the extended mode (see FIG. 3) when the crosspiece must be locked. FIG. 16 illustrates the lift locking mechanism 32 in the unlocked position when the transverse beam 90 has contacted the actuating arm 162. As the actuating arm 162 is pushed upwardly, the bell crank 168 causes the rod 166 to rotate, which, in turn, pulls the link 172 and the corresponding locking pin 174 away from engagement with the guide sleeve 156. When the upper crosspiece 142 is unlocked, it is free to continue its travel upwardly on the guide posts 144, 146.

Figure 10:
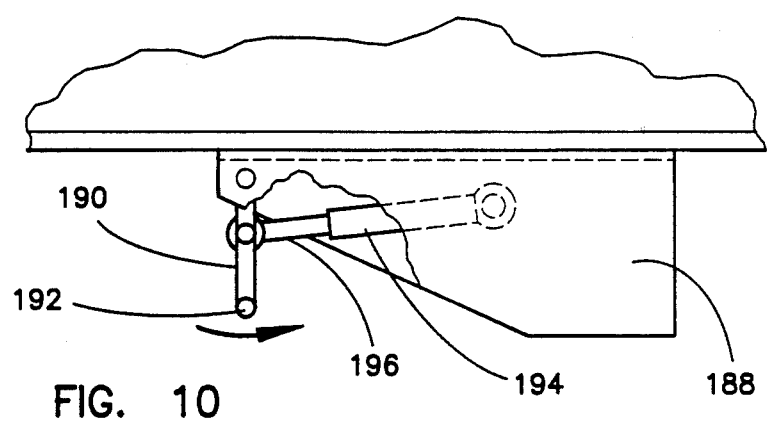
FIG. 10 is a fragmentary elevational view, partly in section, of another aspect of the lock mechanism.
Figure 6:
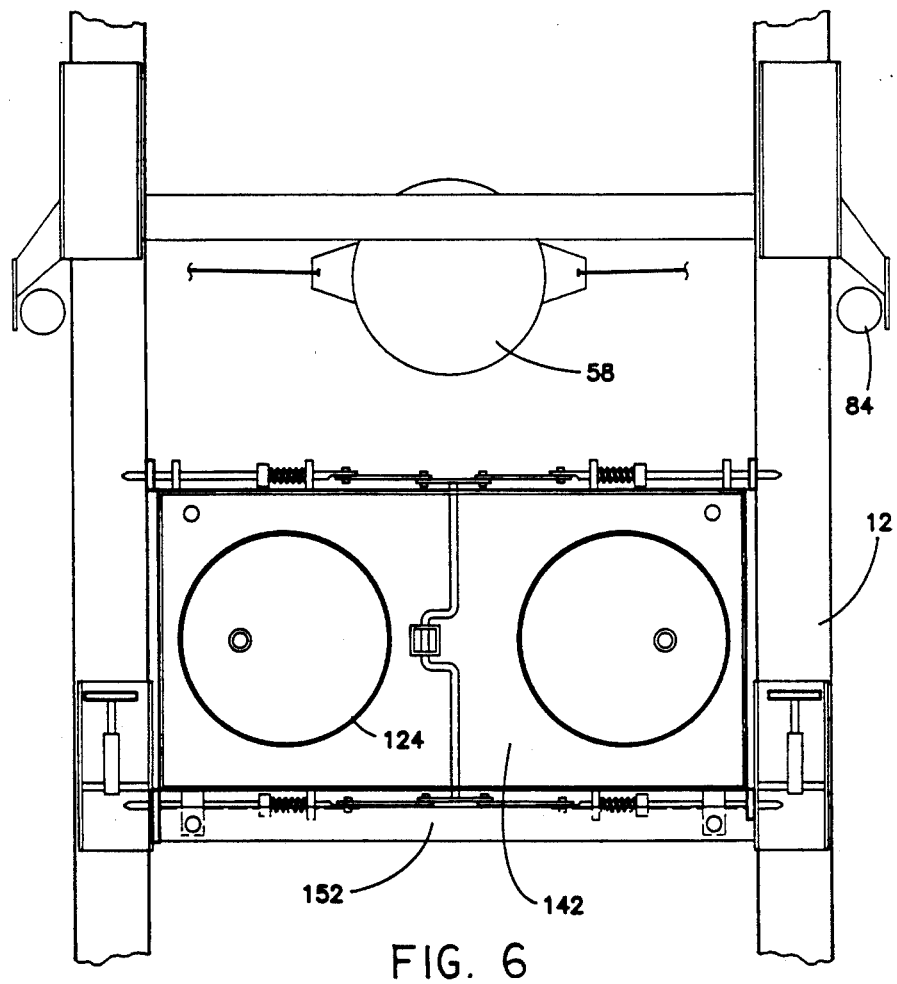
FIG. 6 is a sectional view of the suspension taken along line 6—6 of FIG. 1.

The highway locking means 34 is illustrated in FIG. 10. The support bracket 188 depends from the frame 12, and may, in fact, be integral with the rearward support brackets 154 of the secondary lift mechanism. A ratchet arm 190 is pivotally mounted to the support bracket and has a catch 192 adapted to receive the lock pawl 94 on the trailing arm 22 when the trailing arm is in the retracted position. A pneumatically operated cylinder with a spring return 194 is also mounted to the support bracket 188, and has a shaft 196 extending therefrom which pivotally engages the ratchet arm 190. When the pneumatic cylinder 194 is activated, the ratchet arm 190 is rotated away from the trailing arm 22 so that the catch 192 disengages the locking pawl 94, thus freeing the trailing arm 22 to be extended by the secondary lift mechanism.

Reasonable variation and modifications are possible within the scope of the foregoing disclosure and drawings without departing from the spirit of the invention.

The embodiments of the invention in which an exclusive property or privilege is claimed are defined as follows:

1. In a suspension for a vehicle comprising a frame, said suspension including a pair of control arms pivotally mounted to the frame for swinging movement relative thereto, an axle rigidly mounted to and between the control arms for carrying wheels, a collapsible spring between the control arms and the frame for cushioning the swinging movement of the control arms relative to the frame, and lift means for moving the control arms and the wheels away from a ground-engaging position toward a retracted position relative to the frame, the improvement comprising:
   a member mounted to the frame for movement relative thereto between an upper limit and a lower limit;
   said spring having a first portion connected to the control arms and a second portion connected to the member;
   whereby the wheels can be moved a greater degree away from the ground-engaging position when the lift means is energized and the member is moved toward the upper limit than by collapsing the spring.

2. A vehicle suspension according to claim 1 further comprising guide means fixedly mounted to the frame, wherein the member is movably mounted to the guide means.

3. A vehicle suspension according to claim 2 wherein the guide means comprises vertical rails.

4. A vehicle suspension according to claim 3 wherein the member is platelike and slidably received over the rails.

5. A vehicle suspension according to claim 4 wherein the rails have stops to limit the upward movement of the member.

6. A vehicle suspension according to claim 1 further comprising latch means for locking the member relative to the frame when the retractable means is at the lower limit.

7. A vehicle suspension according to claim 6 wherein the latch means includes actuating means responsive to movement of the lift means for automatically unlocking the member when the member is at the lower limit and when the lift means is energized.

8. A vehicle suspension according to claim 7 wherein the frame has guide sleeves having apertures and the latch means includes pins mounted to the member for reciprocal movement relative thereto, said pins being adapted to extend into the apertures when the member is at the lower limit.

9. A vehicle suspension according to claim 8 wherein a transverse beam is mounted between the control arms, and the actuating means includes a vertical arm operably connected to the pins and adapted to be engaged by the transverse beam when the lift means moves the control arms and the beam toward the retracted position.

10. A vehicle suspension according to claim 1 and further comprising lock means mounted to the frame for locking the control arms in the retracted position.

11. A vehicle suspension according to claim 10 further comprising guide means fixedly mounted to the frame, wherein the member is movably mounted to the guide means.

12. A vehicle suspension according to claim 11 wherein the guide means comprises vertical rails.

13. A vehicle suspension according to claim 12 wherein the member is platelike and slidably received over the rails.

14. A vehicle suspension according to claim 13 wherein the rails have stops to limit the upward movement of the member.

15. A vehicle suspension according to claim 10 further comprising latch means for locking the member relative to the frame when the retractable means is at the lower limit.

16. A vehicle suspension according to claim 15 wherein the latch means includes actuating means responsive to movement of the lift means for automatically unlocking the member when the member is at the lower limit and when the lift means is energized.

17. A vehicle suspension according to claim 16 wherein the frame has guide sleeves having apertures and the latch means includes pins mounted to the member for reciprocal movement relative thereto, said pins being adapted to extend into the apertures when the member is at the lower limit.

18. A vehicle suspension according to claim 17 wherein a transverse beam is mounted between the control arms, and the actuating means includes a vertical arm operably connected to the pins and adapted to be engaged by the transverse beam when the lift means moves the control arms and the beam toward the retracted position.

19. A vehicle suspension according to claim 1 and further comprising movable means for mounting the first portion of the spring to the control arms for maintaining the first portion substantially at a predetermined orientation with respect tot he frame as the control arms swing through an arc.

20. A vehicle suspension according to claim 19 wherein the spring includes an air spring.

21. A vehicle suspension according to claim 20 wherein the first portion is mounted to a piston having a generally upwardly facing orientation relative to the frame, and wherein the movable means comprises:
   a support for pivotally mounting said piston to a control arm; and
   link means pivotally connected to the frame and to the piston for permitting vertical displacement of the piston relative to the frame while maintaining the generally upwardly facing orientation of the piston.

22. A vehicle suspension according to claim 21 wherein the support includes a transverse beam extending between the control arms pivotally mounted thereto and the piston is fixedly mounted to the support.

23. A vehicle suspension according to claim 22 wherein the pivotal connection of the control arms to the frame defines a first horizontal axis, and the pivotal connection of the transverse beam to the control arms defines a second horizontal axis;

said transverse beam has a clevix extending radially therefrom intermediate the control arms; and the link means comprises an arm extending generally perpendicularly to the transverse beam having one end pivotally connected to the frame for movement about a third horizontal axis, and the other end pivotally connected to the clevis for movement about a fourth horizontal axis, thereby defining a parallelogram linkage.

24. In a suspension for a vehicle comprising a frame, a pair of control arms pivotally mounted to the frame for vertical swinging movement relative thereto, an axle rigidly mounted to and between the control arms for carrying ground-engaging wheels, and spring means between the control arms and the frame for cushioning the swinging movement of the control arms relative to the frame, the improvement comprising:

movable means mounting a lower portion of the spring means to the control arms for maintaining a predetermined orientation thereof with respect to the frame as the control arms swing through an arc.

25. A vehicle suspension according to claim 24 wherein the spring means includes an air spring.

26. A vehicle suspension according to claim 25 wherein the air spring has an upper portion mounted to the frame and a lower portion mounted to a piston having a generally upwardly facing orientation relative to the frame, and wherein the movable means comprises:

a support for pivotally mounting said piston to a control arm; and link means pivotally connected to the frame and to the piston for permitting vertical displacement of the piston relative to the frame while maintaining the generally upwardly facing orientation of the piston.

27. A vehicle suspension according to claim 26 wherein the support includes a transverse beam extending between the control arms pivotally mounted thereto and the piston is fixedly mounted to the support.

28. A vehicle suspension according to claim 27 wherein the pivotal connection of the control arms to the frame defines a first horizontal axis, and the pivotal connection of the transverse beam to the control arms defines a second horizontal axis;

said transverse beam has a clevis extending radially therefrom intermediate the control arms; and the link means comprises an arm extending generally perpendicularly to the transverse beam having one end pivotally connected to the frame for movement about a third horizontal axis, and the other end pivotally connected to the clevis for movement about a fourth horizontal axis, thereby defining a parallelogram linkage.

* * * * *

UNITED STATES PATENT AND TRADEMARK OFFICE
CERTIFICATE OF CORRECTION

PATENT NO. : 5,058,916

DATED : October 22, 1991

INVENTOR(S) : WILLIAM J. HICKS

It is certified that error appears in the above-identified patent and that said Letters Patent is hereby corrected as shown below:

Col. 9, claim 6, line 62:
"retractable means" should be --member--.

Col. 10, claim 15, line 32:
"retractable means" should be --member--.

Col. 10, claim 19, line 56:
"tot he" should be --to the--.

Col. 11, claim 23, line 12:
"clevix" should be --clevis--.

Signed and Sealed this

Twenty-third Day of March, 1993

Attest:

STEPHEN G. KUNIN

Attesting Officer

Acting Commissioner of Patents and Trademarks